United States Patent
Neuhaus-Steinmetz et al.

(10) Patent No.: US 6,485,600 B2
(45) Date of Patent: *Nov. 26, 2002

(54) EB AND UV CROSSLINKING OF COMPOSITION LAYERS, AND PRODUCTS PRODUCED WITH THESE LAYERS

(75) Inventors: Hermann Neuhaus-Steinmetz, Ahrensburg (DE); Christian Harder, Hamburg (DE); Maren Klose, Seevetal (DE); Dietlind Thalacker, Hamburg (DE); Werner Karmann, Hamburg (DE)

(73) Assignee: tesa AG, Hamburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,197

(22) Filed: Sep. 30, 1999

(65) Prior Publication Data

US 2002/0157767 A1 Oct. 31, 2002

Related U.S. Application Data

(63) Continuation of application No. 09/409,197, filed on Sep. 30, 1999.

(30) Foreign Application Priority Data

Oct. 12, 1998 (DE) .......................... 198 46 902

(51) Int. Cl.[7] .................................. C08F 2/46

(52) U.S. Cl. .................. 156/273.3; 156/275.5; 156/275.7; 427/493; 427/505; 427/516; 427/208; 427/208.2; 427/208.4

(58) Field of Search ................ 156/273.3, 275.5, 156/275.7, 278, 280; 427/493, 505, 516, 208, 208.2, 208.4, 209; 428/41.8, 41.9, 345

(56) References Cited

U.S. PATENT DOCUMENTS

| 3,920,877 | A | * | 11/1975 | Barber et al. | 428/345 |
|---|---|---|---|---|---|
| 5,194,455 | A | | 3/1993 | Massow et al. | |
| 5,266,400 | A | * | 11/1993 | Yarusso et al. | 428/345 |
| 5,622,761 | A | * | 4/1997 | Cole | 428/41.9 |

FOREIGN PATENT DOCUMENTS

| DE | 38 34 007 A1 | 4/1990 |
|---|---|---|
| DE | 39 42 232 A1 | 6/1991 |
| DE | 43 13 008 C1 | 11/1994 |
| DE | 43 16 317 A1 | 11/1994 |
| DE | 197 16 996 C1 | 6/1998 |
| DE | 197 57 426 A1 | 7/1999 |
| EP | 0 453 254 A2 | 4/1991 |
| EP | 0628616 A | 12/1994 |
| EP | 0 453 254 | 6/1997 |
| WO | 88/01281 | 2/1988 |

OTHER PUBLICATIONS

Abstracts of Japan JP 59056471 A, dated Mar. 31, 1984.
English–language abstract of DE 38 34 007 (Apr. 12, 1990).
Derwent Abstract Ref. No. 95–019475/03; abstract of JP 06306336–A, filed Apr. 22, 1993.

* cited by examiner

*Primary Examiner*—Michael W. Ball
*Assistant Examiner*—John T. Haran
(74) *Attorney, Agent, or Firm*—Christa Hildebrand; Norris Mclaughlin & Marcus, P.A.

(57) ABSTRACT

Process for the radiation crosslinking of double-sided adhesive tapes, in which a backing material coated on both sides with adhesives is irradiated asymmetrically from both sides with different doses in an irradiation means.

13 Claims, 4 Drawing Sheets

EB AND UV CROSSLINKING OF COMPOSITION LAYERS, AND PRODUCTS PRODUCED WITH THESE LAYERS

This is a continued prosecution application of application 09/409,197 filed on Sep. 30, 1999, claiming priority of German Application 198 46 902.0 filed on Oct. 12, 1998.

The invention relates to the electron beam (EB) and also UV crosslinking of composition layers and to products produced with these layers.

BACKGROUND OF THE INVENTION

It has long been known that with acrylate pressure-sensitive adhesive (PSA) compositions in particular the generation of outstanding adhesion properties requires crosslinking. With rubbers, too, the adhesion properties are improved by crosslinking.

In the production of adhesive tapes, the use of radiation crosslinking by means of UV radiation or electron beam (EB) has particular advantages over chemical/thermal crosslinking methods. Radiation crosslinking is also used advantageously to produce double-sided adhesive tapes.

The depth distribution of the absorbed radiation dose in a product exposed to accelerated electrons is known for any given acceleration voltage. A number of authors have developed empirical functions for this (for example, Heger, beta-gamma 1, 20, 1990; Neuhaus-Steinmetz, RadTech Europe, Mediterraneo 1993).

If the maximum acceleration voltage of the electron beam unit is inadequate for sufficiently uniform irradiation through the product owing to its high weight per unit area, the literature, and company brochures, describe the possibility of irradiation from both sides, the acceleration voltage and radiation dose set for both sides being the same.

For products which consist of a coating to be crosslinked, which can, for example, be a pressure-sensitive adhesive, and of a radiation-degradable backing, such as, for example, paper, woven or nonwoven cellulose, and OPP films, the damage can be minimized by optimizing the acceleration voltage. In this case the backing receives a significantly lower average dose than does the coating, while the dose reduction in the coating remains within acceptable limits.

Such conditions are described, inter alia, in EP 0 453 254 B (Yarosso et al.) and in the paper accompanying a lecture given by Dr Karmann to the $7^{th}$ Munich Adhesives and Finishing Seminar, 1982.

A double-sided adhesive tape consisting of a backing with the adhesive compositions to be crosslinked on both sides and with an antiadhesive release liner should receive a dose of not more than about 10 to 50 kGy when irradiated uniformly from one side with accelerated electrons; otherwise, the release liner must be changed owing to the unacceptable deterioration of the mechanical and antiadhesive properties. The maximum acceptable absorbed radiation dose is a function of the type of pressure-sensitive adhesive and type of release coating.

Even here, given suitable layer thicknesses, a reduction in the unwanted effects can be achieved by a skilful choice of the accelerating voltage if the radiation dose in the release liner has already dropped significantly. However, it should be noted here that the PSA layer facing the release liner must still receive a radiation dose sufficient for crosslinking.

If both sides of a double-sided adhesive tape comprising a backing with PSA compositions on both sides and an antiadhesive release liner is irradiated symmetrically, the latter receives the full radiation dose. This also applies to those tapes known as transfer tapes, in which the pressure-sensitive adhesive to be crosslinked is coated without a further backing onto a release liner.

From the remarks above it is clear that the necessary expenditure for the crosslinking of double-sided adhesive tapes with electron beams becomes considerable when the radiation doses required to crosslink the PSA layer are so high that the mechanical and antiadhesive properties of the release liner are damaged to an unacceptable extent, since in that case the release liner must be changed for a new, unexposed liner by re-covering.

The object of the invention is to allow advantageous manufacture of double-sided adhesive tapes or, generally, double-sidedly coated backing materials, with radiation crosslinking using accelerated electrons or UV radiation.

SUMMARY OF THE INVENTION

This object is achieved by a process as set out in the main claim. The subclaims describe advantageous embodiments of the process and also a second embodiment of the process.

The invention accordingly provides a process for the radiation crosslinking of double-sided adhesive tapes, in which a backing material coated on both sides with adhesives is irradiated asymmetrically from both sides with different doses in an irradiation means.

DETAILED DESCRIPTION

In one advantageous embodiment, the process for the radiation crosslinking of double-sided adhesive tapes consists of the following steps:

a) coating a backing material with an adhesive A, b) EB-crosslinking the adhesive A/backing subunit on the composition side with a dose A and acceleration voltage A set on the EB unit, c) lining the adhesive A with a release liner, d) coating the second side of the backing material with the adhesive B, and e) EB-irradiating the assembly on the exposed side of the adhesive composition B with a dose B and acceleration voltage B set on the EB unit, the side carrying the release liner being guided through the EB unit preferably on a cooling roll and the dose A and the dose B and/or the acceleration voltage A and the acceleration voltage B having different values.

There is no need to change the release liner, and no re-covering operation is necessary. The steps of the process can be performed in one pass. If considered necessary, it is also possible to carry out in-line pretreatment and an additional levelling of the backing, i.e. a smoothing of the backing by heating owing to an absence of flatness in the backing (warping, for example).

To this end, first of all, in the case of EB crosslinking, the acceleration voltage and dose for the second irradiation that are to be set on the EB unit are calculated as a function of the individual thicknesses of the layers of the assembly, with total doses of up to 80 kGy or more in the composition layers, preferably with the aid of a computer program, such that a) the dose on the exposed side of the release liner remains less than 40 kGy, preferably less than 10 kGy, b) the dose at the release liner/adhesive composition A interface remains less than 50 kGy, preferably less than 15 kGy, c) the surface dose in the adhesive composition B remains less than (target dose +25%), preferably less than (target dose +15 %), and d) the dose at the backing/adhesive composition B interface remains greater than (target dose—25%), preferably greater than (target dose—15%), e) while on the other hand the dose reduction in the adhesive composition B towards the backing does not exceed 45%, preferably 25%, of the target dose.

The target dose denote s that radiation dose absorbed by the adhesive composition at which optimum product properties are obtained.

The acceleration voltage and the radiation dose for the first irradiation are then calculated in such a way (for example, with Gauss-Newton approximation) that the total radiation dose in the layer of adhesive composition A deviates by less than 30%, preferably less than 10%, from the desired target value, which may be different from the target value of the adhesive composition B.

As a basis for the calculation use is made, for example, of the following empirical formula, which was published by Neuhaus-Steinmetz at RadTech Europe, Mediterraneo 1993.

$$D\ [\%] = \frac{\exp\left\{-\left(\frac{18.8 * X}{(U_B)^{1.57}} - 0.7\right)^2\right\}}{1 + \left(\frac{9.7 * X}{(U_B)^{1.57}}\right)^{15}}$$

where D is the dose in % $U_B$ is the acceleration voltage in kV X is the irradiated weight per unit area, in g/m$^2$, consisting of the weights per unit area of the vacuum window, of the air gap between vacuum window and product, and of the depth in the product The asymmetric irradiation from two sides permits a defined and sufficiently uniform radiation dose in the two adhesive layers with a greatly reduced radiation dose in the release liner. This does away with laborious and error-susceptible re-covering operations.

In addition, the process also permits controlled differences in the degree of crosslinking of the adhesive compositions on either side of the adhesive tape.

It is also possible to set controlled crosslinking profiles over the depth of the layers of adhesive composition. For this purpose, the acceleration voltages and set doses in the first and second irradiation are preferably chosen so that towards the backing in the adhesive composition A an ascending or descending depth/dose profile is formed, with which adhesive properties are influenced in a controlled manner.

The resulting radiation doses can, furthermore, preferably be up to 80 kGy or more in the adhesive compositions, and the chosen EB acceleration voltages can be from 40 to 350 kV. The weight per unit area in the beam path to the product, which is dependent on the design of an electron beam accelerator and consists of the weights per unit area of the vacuum window and of the air gap to the product, can typically be between 20 and 250 g/m$^2$.

The adhesive compositions used can be acrylates and rubbers, applied from solution or from dispersion, or else hot-melt adhesive compositions, it also being possible for the adhesive compositions A and B to be different.

The adhesive compositions may, furthermore, be filled, coloured and/or foamed.

The backing materials employed are, in particular, those made of MOPP, BOPP, HDPE, LDPE, polyester, PVC, paper, nonwovens or foams.

Finally, the process can be employed in general for the radiation crosslinking of double-sidedly coated backing materials, where a double-sidedly coated backing material is irradiated asymmetrically from both sides with different doses in an irradiation means.

In this case, the coatings concerned are not adhesive compositions.

In a first alternative preferred embodiment, the process for the radiation crosslinking of double-sided adhesive tapes consists of the following steps:

a) coating a backing material with an adhesive A, b) EB-crosslinking the adhesive A/backing subunit on the composition side with a set dose A and the acceleration voltage A, it being possible for the adhesive A to be both UV- and EB-crosslinkable, c) lining the adhesive A with a release liner, d) coating the second side of the backing material with the adhesive B, and e) UV-irradiating the assembly on the exposed side of the adhesive composition B with a surface dose B.

For the first irradiation, the acceleration voltage and the set dose for the electron beams, and for the second irradiation the penetration depth of the UV radiation, can be chosen, through the selection of a photoinitiator with an appropriate wavelength, in such a way that the profile of crosslinking towards the backing in the adhesive composition A is virtually constant.

This embodiment also offers advantages with EB-degradable backings, which in this case are exposed significantly less than in the case of EB crosslinking from two sides. In addition, the release liner receives no EB dose.

In the second crosslinking pass with UV radiation, the absorbed UV dose in the adhesive B decreases with the depth towards the backing, approximately in an exponential function. Furthermore, it passes through a UV-permeable backing before penetrating into the adhesive A, where, in turn, an approximately exponential drop in the UV dose takes place from the backing towards the release liner.

In the first crosslinking pass with EB, the set dose A and the acceleration voltage A are chosen so that in the adhesive A following the second crosslinking pass with UV radiation an approximately uniform crosslinking over the depth is achieved, specifically by means of an opposite EB dose gradient, or else so that controlled profiles of crosslinking are produced.

If the precise depth-related decrease in the UV dose in the adhesives and in the backing is known, the parameters can be optimized in a purely mathematical procedure. Otherwise, experimental optimization, in particular of the accelerating voltage A, is advantageous.

In a second alternative preferred embodiment, the process for the radiation crosslinking of double-sided adhesive tapes consists of the following steps:

a) coating a backing material with an adhesive A, which can be both UV- and EB-crosslinkable, b) UV-irradiating the backing, provided with the adhesive A, with a surface dose A in an irradiation means, it being possible for the adhesive A to be both UV- and EB-crosslinkable, c) lining the adhesive A with a release liner, d) coating the second side of the backing material with the adhesive B, and e) EB-irradiating the assembly on the exposed side of the adhesive composition B with a dose B and acceleration voltage B set on the EB unit, the side carrying the release liner being guided through the EB unit preferably on a cooling roll.

Within the adhesive A, the absorbed UV dose decreases with the depth towards the backing in an approximately exponential function, the extent of the decrease in the desired wavelength range depending on various factors. From a certain layer thickness, therefore, there is insufficient crosslinking of the adhesive towards the backing. This is compensated by an opposite EB dose gradient from the EB irradiation in the following pass.

The set dose B and the acceleration voltage B are chosen in this case so that the dose ranges for the adhesive B and for the release liner, specified in the first advantageous embodiment, are observed. If the precise depth-related decrease of the UV dose is known, the parameters can be optimized by purely mathematical means. Otherwise, an experimental optimization (in particular of the accelerating voltage B) is advantageous.

In a third alternative preferred embodiment, the process for the radiation crosslinking of double-sided adhesive tapes consists of the following steps:
 a) coating a release liner with an adhesive A,
 b) EB-crosslinking the adhesive A/release liner subunit on the composition side with a dose A and acceleration voltage A set on the EB unit,
 c) lining the adhesive A with a backing material,
 d) coating the second side of the backing material with the adhesive B, and
 e) EB-irradiating the assembly on the exposed side of the adhesive composition B with a dose B and acceleration voltage B set on the EB unit, the side carrying the release liner being guided through the EB unit preferably on a cooling roll and the dose A and the dose B and/or the acceleration voltage A and the acceleration voltage B having different values.

In a fourth alternative preferred embodiment, the process for the radiation crosslinking of double-sided adhesive tapes consists of the following steps:
 a) coating a release liner with an adhesive A,
 b) UV-irradiating the release liner, provided with the adhesive A, with a surface dose A in an irradiation means, it being possible for the adhesive A to be both UV- and EB-crosslinkable,
 c) lining the adhesive A with a backing material,
 d) coating the second side of the backing material with the adhesive B, and
 e) EB-irradiating the assembly on the exposed side of the adhesive composition B with a dose B and acceleration voltage B set on the EB unit, the side carrying the release liner being guided through the EB unit preferably on a cooling roll and the surface dose A being different from the dose B.

For the first irradiation, the penetration depth of the UV radiation, through the selection of a photoinitiator with an appropriate wavelength, and for the second irradiation the acceleration voltage B and the set dose B for the election beams, can be chosen in such a way that the profile of crosslinking towards the backing in the adhesive composition A is virtually constant, with which adhesive properties are influenced in a controlled manner.

Furthermore, for the first irradiation, the penetration depth of the UV radiation can be chosen through the selection of a photoinitiator with an appropriate wavelength, and for the second irradiation the acceleration voltage B and the set dose B for the electron beams can be chosen in such a way that the profile of crosslinking towards the backing in the adhesive composition A is ascending or descending, with which adhesion properties are influenced in a controlled manner.

The purpose of the text below is to illustrate processes of the invention on the basis of a number of examples without, however, wishing to restrict the said processes unnecessarily.

EXAMPLE 1

A double-sided adhesive tape is manufactured in the operations of
 a) coating a backing with a first composition layer,
 b) electron beam-crosslinking the subunit,
 c) applying a release liner,
 d) coating the backing with the second composition layer, and
 e) electron beam-crosslinking the assembly.

The electron beam units employed have a weight per unit area between high vacuum and product, requiring irradiation, of 124 g/m$^2$.

The thicknesses of the individual layers of the product are as follows:
 a) MOPP backing: 45 g/m$^2$
 b) first composition layer: 100 g/m$^2$, acrylate
 c) release liner: 80 g/m$^2$, and
 d) second composition layer: 100 g/m$^2$, acrylate The acrylate adhesive compositions correspond to those described, for example, in DE 39 42 232 or DE 43 13 008.

Figure 1:
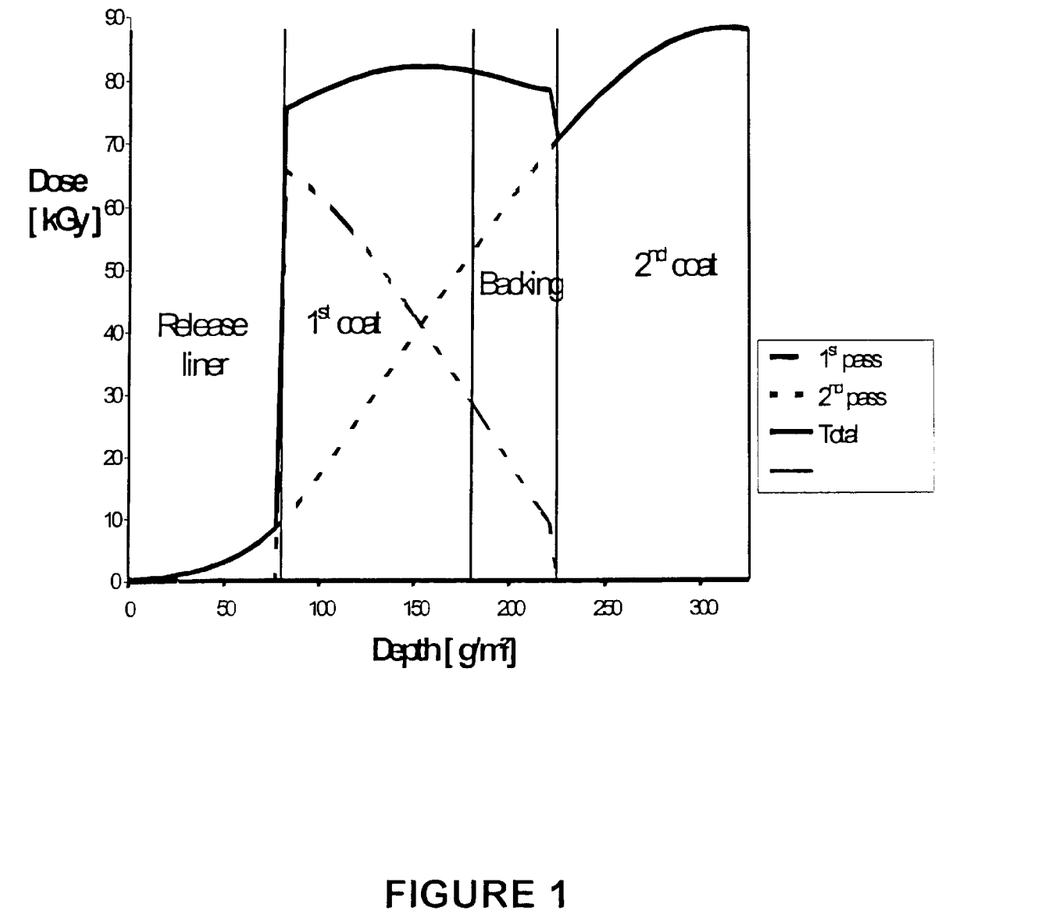
FIG. 1 shows the total dose in the two composition layers of Example 1.

At an acceleration voltage of 150 kV and a set dose of 67 kGy for the first crosslinking step, and an acceleration voltage of 183 kV and a set dose of 88 kGy for the second crosslinking step, the total dose in the two composition layers is within 80±9 kGy.

The release liner receives less than 10 kGy on the side facing the first composition layer and less than 2 kGy on the exposed side. Only moderate increases are found in unwind force and peel force, and there is no observed picking as a result of damage to the release liner.

The determination of the unwind force is based on AFERA 4013/DIN E 1944, and the peel force corresponds to the release force in accordance with FTM 3 from FINAT, without storage at temperature.

The adhesion properties correspond to those of an alternative manufacturing process for which, after the coating of both sides, the overall assembly is irradiated just once with a set dose of 80 kGy at an acceleration voltage of 250 kV. In this case, however, the increases in the unwind force and peel force are so drastic that the release liner has to be changed shortly after electron beam crosslinking.

With a reduction in the acceleration voltage to 210 kV, on the one hand the dose in the first composition layer is already too low for the adhesive tape to have sufficient resistance to shear forces, while on the other hand the dose reduction in the release liner is still not sufficient to prevent unacceptable damage to the release liner.

EXAMPLE 2

The steps of preparing the adhesive tape correspond to those of Example 1.

The electron beam units employed have a weight per unit area between high vacuum and product, requiring irradiation, of 76 g/m$^2$.

Figure 2:
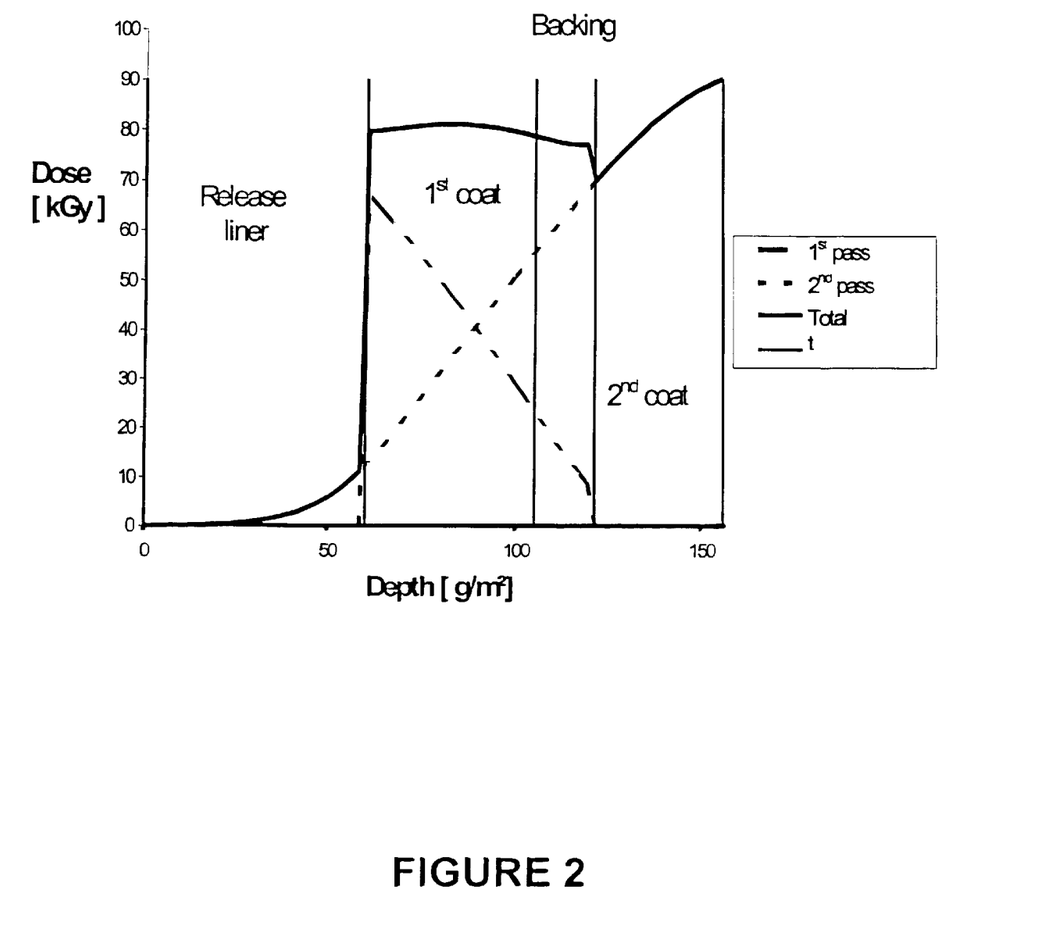
FIG. 2 shows the total dose in the two composition layers of Example 2.

The thicknesses of the individual layers of the product are as follows:
- cellulose nonwoven backing: 13 g/m$^2$
- first composition layer: 45 g/m$^2$, acrylate
- release liner: 60 g/m$^2$, and
- second composition layer: 35 g/m$^2$, acrylate At an acceleration voltage of 97 kV and a set dose of 67 kGy for the first crosslinking step, and an acceleration voltage of 114 kV and a set dose of 90 kGy for the second crosslinking step, the total dose in the two composition layers is within 80±10 kGy;

The release liner receives less than 12 kGy on the side facing the first composition layer and less than 1 kGy on the exposed side.

The adhesion properties again correspond to those of a production process with single-sided homogeneous irradiation at target dose. Here again, it was impossible to achieve a sufficient reduction in the dose in the release liner to avoid the damage, owing to an insufficient dose in the composition layer A.

EXAMPLE 3

A double-sided adhesive tape is manufactured in the operations of
- a) coating a release liner with a first compositon layer,
- b) electron beam-crosslinking the first composition layer on the release liner,
- c) applying the backing,
- d) coating the assembly on the backing side with the second composition layer, and
- e) electron beam-crosslinking the assembly.

The electron beam units employed have a weight per unit area between high vacuum and product, requiring irradiation, of 122 g/m$^2$.

Figure 3:
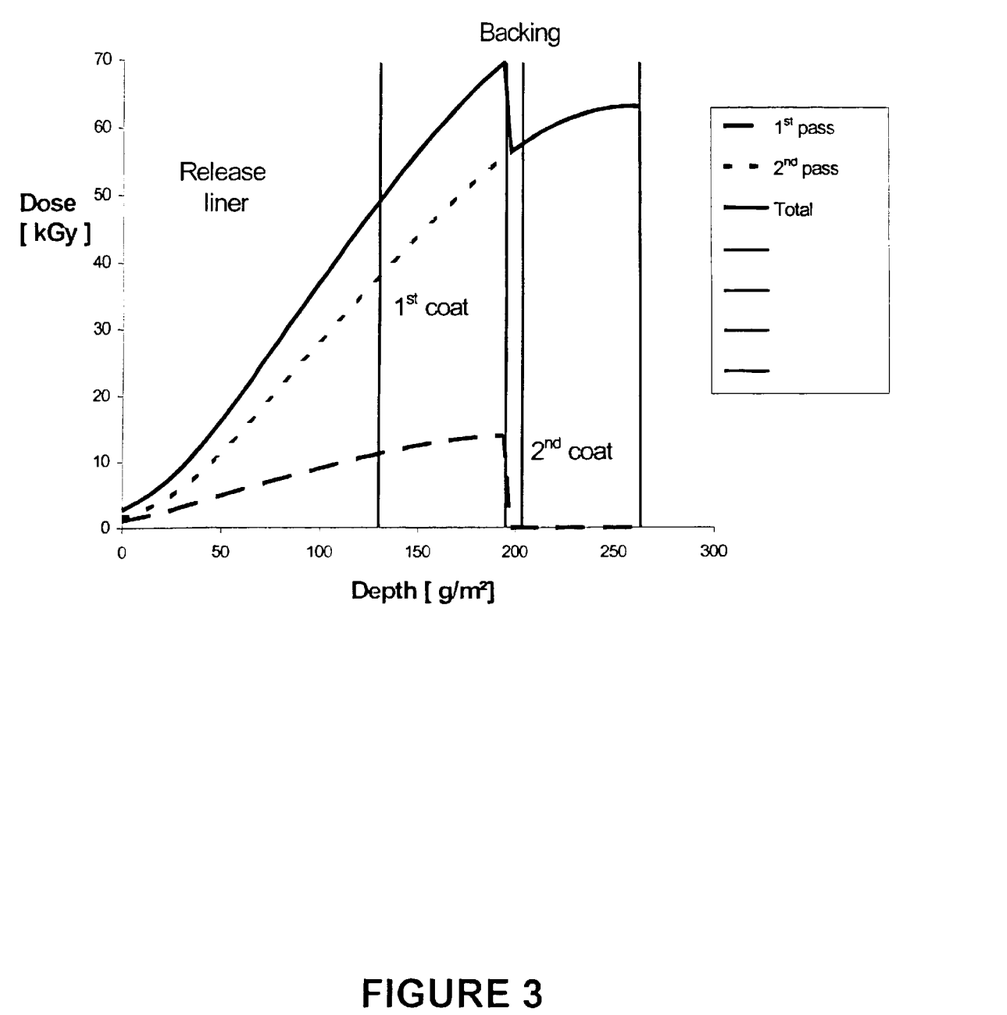
FIG. 3 shows the total dose in the two composition layers of Example 3.

The thicknesses of the individual layers of the product are as follows:
- cellulose nonwoven backing: 8.5 g/m$^2$
- first composition layer: 65 g/m$^2$, acrylate
- release liner: 130 g/m$^2$, and
- second composition layer: 60 g/m$^2$, acrylate At an acceleration voltage of 164 kV and a set dose of 14 kGy for the first crosslinking step, and an acceleration voltage of 178 kV and a set dose of 63 kGy for the second crosslinking step, the total dose in the two composition layers is within 60±11 kGy.

The release liner receives less than 50 kGy on the side facing the first composition layer and less than 5 kGy on the exposed side. There is no observed picking as a result of damage to the release liner. The increases in the unwind and peel force are within the tolerable range.

The adhesion properties correspond to those of an alternative manufacturing process for which, after the coating of both sides, the overall assembly is irradiated just once with a set dose of 60 kGy at an acceleration voltage of 205 kV.

In this case, however, the increases in the unwind force are so drastic that the release liner has to be changed shortly after electron beam crosslinking.

With a reduction in the radiation exposure of the exposed side of the release liner to the level of this example through a small acceleration voltage of 180 kV, the dose in the first composition layer is already too low for the adhesive tape to have sufficient resistance to shear forces, while the unwind forces correspond to the example.

EXAMPLE 4

The steps of preparing the adhesive tape, the product structure, and the electron beam unit correspond to those from Example 1, but the second composition layer requires an EB dose of only 50 kGy.

Figure 4:
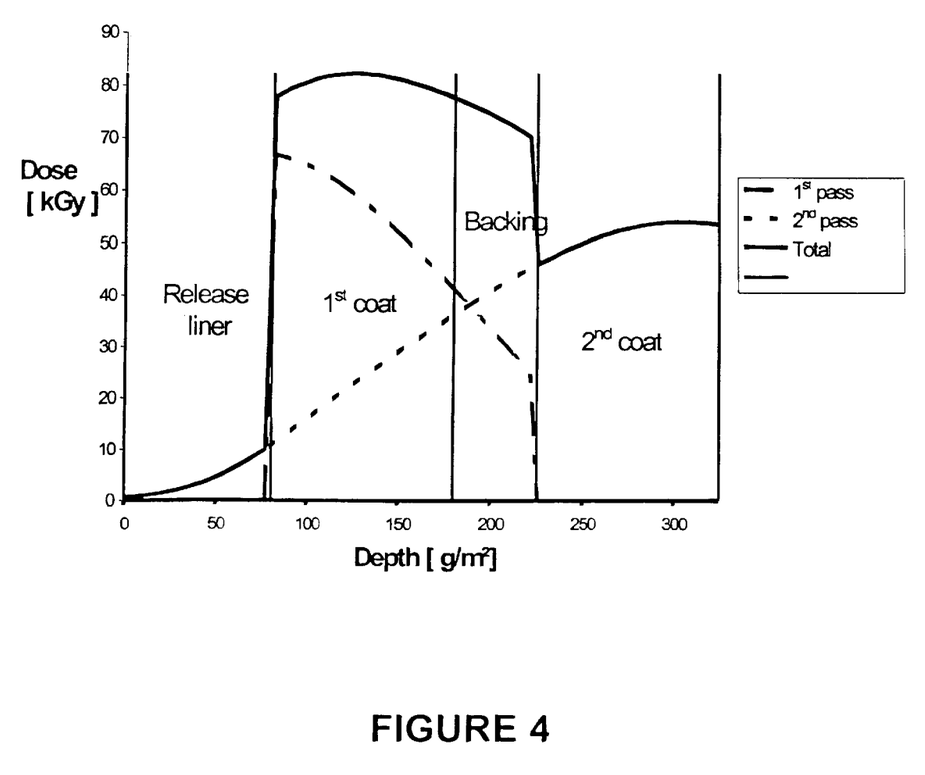
FIG. 4 shows the total dose in the two composition layers of Example 4.

At an acceleration voltage of 164 kV and a set dose of 67 kGy for the first crosslinking step, and an acceleration voltage of 190 kV and a set dose of 54 kGy for the second crosslinking step, the total dose in the first composition layer is 80±4 kGy and the total dose in the second composition layer is 50±4 kGy.

The release liner receives less than 12 kGy on the side facing the first composition layer and less than 2 kGy on the exposed side.

The adhesion properties correspond to the required values.

Owing to the different total doses in the adhesive layers, this product cannot be produced with single-sided irradiation, nor with symmetrical irradiation from two sides.

EXAMPLE 5

A double-sided adhesive tape is manufactured in the operations of
- a) coating a backing with a first composition layer,
- b) UV-crosslinking the subunit,
- c) applying a release liner,
- d) coating the backing with the second composition layer, and
- e) electron beam-crosslinking the assembly.

The electron beam unit employed has a weight per unit area between high vacuum and product, requiring irradiation, of 76 g/m$^2$.

The thicknesses of the individual layers of the product are as follows:
- PP backing: 28 µm
- first composition layer: 70 g/m$^2$, acrylate
- release liner: 80 g/m$^2$, and
- second composition layer: 70 g/m$^2$, acrylate The first composition layer is both UV-crosslinkable and electron beam-crosslinkable. It is crosslinked with the aid of medium-pressure mercury UV lamps or low-pressure UVC lamps at a UVC surface dose of 75 mJ/cm$^2$ for the photoinitiator benzoin acrylate, which is incorporated by polymerization at a level of 0.5 per cent by weight. With the first adhesive composition employed, the UVC intensity is halved about every 25 g/m2 with the depth, this half-value depth being influenced by a variety of factors.

At an acceleration voltage of 145 kV and a set dose of 87 kGy for the second crosslinking step, the dose in the second composition layer is within 80±7 kGy for the election beam crosslinking.

The release liner receives less than 12 kGy on the side facing the first composition layer and less than 1 kGy on the exposed side. Only moderate increases are found in unwind force and peel force, and there is no observed picking as a result of damage to the release liner.

In addition to the UVC dose, the first composition layer also receives a fraction of the electron beam dose, as a result of which the UVC dose gradient in the first adhesive layer, which is predetermined for one composition recipe, is compensated by an opposite EB gradient, and a sufficiently constant crosslinking is achieved.

Without the electron beam crosslinking on the second composition side, the cohesion of the first composition layer is insufficient to achieve the required shear resistance of the product.

EXAMPLE 6

A double-sided adhesive tape is manufactured in the operations of
 a) coating a backing with a first composition layer,
 b) EB-crosslinking the subunit,
 c) applying a release liner,
 d) coating the backing with the second composition layer, and
 e) UV-crosslinking the assembly.

The first composition layer is both UV-crosslinkable and electron beam-crosslinkable.

The electron beam unit employed has a weight per unit area between high vacuum and product, requiring irradiation, of 76 g/m$^2$.

The thicknesses of the individual layers of the product are as follows:
 PTE backing: 12 g/m$^2$
 first composition layer: 60 g/m$^2$, acrylate
 release liner: 80 g/m$^2$, and
 second composition layer: 30 g/m$^2$, acrylate The first crosslinking step takes place at an acceleration voltage of 122 kV and a set dose of 75 kGy. The second crosslinking step takes place with the aid of medium-pressure mercury UV lamps or low-pressure UVC lamps with a UVC dose of 75 mJ/cm$^2$ for the copolymerized photoinitiator, benzoin acrylate.

In addition to the set EB dose, the first composition layer also receives a fraction of the set UVC dose.

The depth-related dose decrease in the product is dependent, for UV radiation, on the chemical system and on the wavelength, and with a given photoinitiator cannot be influenced to any great extent without side-effects. The resulting crosslinking from EB dose and UV dose over the depth in the first composition layer is set, via the acceleration voltage and the set EB dose, for optimum adhesion properties of the first composition layer. There is virtually no exposure of the release liner. No increases are found in unwind force and peel force, and there is no observed picking as a result of damage to the release liner.

What is claimed is:

1. A process for radiation cross-linking of a double-sided adhesive tape comprising the steps of
 a) providing a backing material having a first and a second side;
 b) coating the first and the second side with a layer of adhesive, each having a thickness;
 c) irradiating the first side with electron beam radiation to provide radiation cross-linking of the adhesive layer;
 d) irradiating the second side with ultra violet radiation-to provide radiation cross-linking of the adhesive layer; and
 wherein the radiation dose and acceleration energy used for irradiating the first side is less than the radiation dose and acceleration energy used for irradiating the second side.

2. A process for radiation cross-linking of a double-sided adhesive tape comprising the steps of
 a) providing a backing material having a first and a second side;
 b) coating the first and the second side with a layer of adhesive, each having a thickness;
 c) irradiating the first side with electron beam radiation to provide radiation cross-linking of the adhesive layer;
 d) irradiating the second side with ultra violet radiation to provide radiation cross-linking of the adhesive layer; and
 wherein the radiation dose and acceleration energy used for irradiating the second side is less than the radiation does and acceleration energy used for irradiating the first side.

3. The process according to claim 1, further comprising the step of
 providing a release liner to the adhesive coated on the first side;
 wherein the adhesive coated on the first side and the adhesive coated on the second side are different adhesives.

4. The process according to claim 2, further comprising the step of
 providing a release liner to the adhesive coatings on the first side;
 wherein the adhesive coated on the first side and the adhesive coated on the second side are different adhesives.

5. The process according to claim 1, further comprising the step of
 providing a release liner to the adhesive coated on the second side;
 wherein the adhesive coated on the first side and the adhesive coated on the second side are different adhesives; and
 wherein the adhesive coated on the first side is also cross-linkable with ultra violet.

6. The process according to claim 2, further comprising the step of
 providing a release liner to the adhesive coated on the first side;
 wherein the adhesive coated on the first side and the adhesive coated on the second side are different adhesives; and
 wherein the adhesive coated on the first side is also cross-linkable with ultra violet.

7. The process according to claim 3, further providing the step of guiding tape through a cooling roll, with the release liner facing the cooling roll while irradiating electron beam radiation.

8. The process according to claim 3, wherein the radiation dose and acceleration energy of the electron beam radiation is calculated such that the sum of the radiation dose and acceleration energy of the electron beam radiation and the radiation dose and acceleration energy of the ultra violet radiation deviates not more than 30% of a predetermined target value.

9. The process according to claim 4, wherein the radiation dose is chosen such that the radiation dose at an interface between release liner and the first adhesive does not exceed 50 kGy, and the radiation energy on a second interface between the backing material and the first adhesive does not exceed 40 kGy, and at the second adhesive on the second side of the backing material, the energy reduction does not exceed 45% of a predetermined target energy for the second adhesive.

10. The process according to claim 3 or 4, wherein a penetration depth of the ultra-violet radiation is determined by selecting a photo initiator with a specific wavelength, and for the electron beam radiation, the radiation energy is chosen such that in the second adhesive, an approximately constant profile of cross-linking towards the backing material is formed.

11. The process according to claim 4, wherein each of the adhesives is one of acrylates, rubbers and hot-melt adhesives, the acrylates and rubbers are used from solution or from dispersion.

12. The process according to claim 4, wherein each of the adhesives is one of coloured or foamed or both.

13. The process according to claim 1 or 2, wherein the backing material is one of MOPP, BOPP, HDPE, LDPE, polyester, PVC, paper, non-woven material and foam.

* * * * *

UNITED STATES PATENT AND TRADEMARK OFFICE
CERTIFICATE OF CORRECTION

PATENT NO. : 6,485,600 B2
DATED : November 26, 2002
INVENTOR(S) : Hermann Neuhaus-Steinmetz et al.

It is certified that error appears in the above-identified patent and that said Letters Patent is hereby corrected as shown below:

Column 10,
Line 26, change "coatings" to -- coating --

Signed and Sealed this

Third Day of June, 2003

JAMES E. ROGAN
*Director of the United States Patent and Trademark Office*